United States Patent
Kendell

[15] 3,691,405
[45] Sept. 12, 1972

[54] THERMOCOUPLE RESPONSE TIME COMPENSATION CIRCUIT ARRANGEMENT

[72] Inventor: Roy Kendell, Harrow, England
[73] Assignee: Ultra Electronics Limited, London, England
[22] Filed: Aug. 10, 1971
[21] Appl. No.: 170,459

[52] U.S. Cl. ............307/295, 60/39.28 T, 307/240, 307/310, 328/3, 328/162
[51] Int. Cl. .................................................F02g 3/00
[58] Field of Search ...........60/39.28 T, 39.29, 39.25; 307/240, 295, 310; 328/3, 162, 163, 164

[56] References Cited

UNITED STATES PATENTS

| 2,971,328 | 2/1961 | McLafferty | 60/39.29 |
| 3,252,099 | 5/1966 | Dodd | 328/164 X |
| 3,319,613 | 6/1967 | Begley et al. | 123/32 EA |
| 3,482,113 | 12/1969 | Heesh | 307/240 X |
| 3,500,065 | 3/1970 | Kerins | 328/3 X |
| 3,648,033 | 3/1972 | Bader | 60/39.28 T |

Primary Examiner—Donald D. Forrer
Assistant Examiner—R. C. Woodbridge
Attorney—Kemon, Palmer & Estabrook

[57] ABSTRACT

A circuit for use in a gas turbine engine system with a gas temperature-sensing thermocouple to compensate for time lag in the response of the thermocouple to gas temperature change and, particularly, to compensate for increase in the time lag with decrease in engine speed. In addition to a continuous proportional signal, a periodical pulse signal is produced at a frequency proportional to the engine speed and an amplitude proportional to the change of thermocouple output voltage over each period. The amplitudes of the two signals are sampled by a sample-and-hold circuit to produce an output. Since the frequency of the pulse signal is proportional to engine speed, sampling intervals are longer the slower the engine, with a corresponding increase in the amplitudes of the pulses. A change in thermocouple output voltage is thus accentuated more, the slower the engine speed.

7 Claims, 4 Drawing Figures

INVENTOR
ROY KENDELL

THERMOCOUPLE RESPONSE TIME COMPENSATION CIRCUIT ARRANGEMENT

The invention relates to a thermocouple response time compensation circuit arrangement, particularly for use on a gas turbine automotive engine, the speed of which is monitored and reproduced in analogue form as the frequency of an electrical signal. A problem with thermocouples is that the output signal from the thermocouple always lags the temperature change at the thermocouple junction. In control systems this can be very disadvantageous, and it is an object of the present invention to provide a circuit arrangement which utilizes the output from a thermocouple to reproduce an electrical signal more analogous to the temperature variations occurring at the thermocouple junction.

The principle of the invention is to compensate for changes in the thermocouple time constants which vary as a function of engine speed. Previously the lag in the response characteristic has been compensated by introducing into the signal processing circuitry a lead circuit which provides a predetermined compensation. However, because the thermocouple time constant varies with engine speed as the compensation remains fixed, the system response can be overdamped (under compensated) at low engine speeds, or underdamped (over compensated) at high engine speeds.

The known lead circuits generally consist of a resistor/capacitor network and the present invention provides an arrangement in which the effective value of the capacitor in the lead network is dependent upon engine speed.

By modifying the known circuit by placing a switch in series with the capacitor in the lead network and by providing a sample and hold circuit at the output, and controlling the switching according to engine speed, the effective value of the capacitor is set by the ratio of the time between samples to the sampling time. That is to say if the engine speed is represented by a signal of variable mark-to-space ratio, this ratio will determine the effective lead and hence compensation provided by the arrangement. The mark/space signals have a substantially constant mark pulse width but a variable space so as to provide the desired variable mark-to-space ratio.

According to one aspect of the invention there is provided a thermocouple response time compensation circuit arrangement for use in a turbine engine system of a type including a speed sensor and a thermocouple, wherein the speed sensor is adapted to produce a periodic electrical signal of a frequency proportional to the engine speed and wherein the thermocouple is arranged to sense the temperature of gas in a predetermined part of the engine and to produce a voltage output of a magnitude dependent on the gas temperature, said thermocouple response time compensation circuit arrangement comprising:

means for sampling the voltage output of the thermocouple to provide a first signal proportional to the voltage output;

means for defining time intervals each of a duration inversely proportional to the speed of the engine in response to said speed sensor;

means for detecting the magnitude of the change if any in the magnitude of the output voltage of the thermocouple from the beginning to the end of each respective time interval and for providing at the end of each time interval a limited duration second signal of a magnitude proportional to the magnitude of such change;

means for summing said first signal and said second signal;

means for sampling the sum of said first signal and said second signal periodically and for producing a limited duration third signal of a magnitude proportional thereto; and means for producing a fourth signal of a longer duration than said third signal and a magnitude equal to the magnitude of said third signal;

whereby a given rate of change in the thermocouple output voltage results in said second signal having a greater amplitude the lower the engine speed to compensate for an increase in the thermocouple time constant with a lower engine speed, so that said fourth signal represents a closer approximation to the actual instantaneous gas temperature than said first signal when the gas temperature is changing.

According to another aspect of the invention there is provided a thermocouple response time compensation circuit arrangement for use in a turbine engine system of a type including a speed sensor and a thermocouple, wherein the speed sensor is adapted to produce a periodic electrical signal of a frequency proportional to the engine speed and wherein the thermocouple is arranged to sense the temperature of gas in a predetermined part of the engine and to produce a voltage output of a magnitude dependent on the gas temperature, said thermocouple response time compensation circuit arrangement comprising:

means for producing a first signal of a magnitude proportional to the magnitude of the thermocouple output voltage;

means for producing a periodic pulse-form second signal at a frequency proportional to engine speed and an amplitude proportional to the change if any of the thermocouple output voltage over each period of said second signal; and means for producing an output signal proportional to the sums of the magnitudes of said first signal and said second signal.

According to another aspect of the present invention, there is provided a thermocouple response time compensation circuit arrangement for use on a turbine engine, the speed of which is monitored and reproduced in analogue form as the frequency of an electrical signal, said circuit arrangement comprising sampling means for sampling the output signal from the thermocouple at a rate dependent upon the frequency of said electrical signal, holding means for holding the sampled signal between samples, the arrangement being such that the sampling rate is increased proportionally to the turbine engine speed so that the difference in sampled signal levels decreases as the engine speed increases, so that a smaller current is required to reset the hold means so giving a smaller differential effect.

The sampling means preferably includes a pair of field effect transistors driven as switches from a common source. The holding means may be a capacitance in an output circuit of one of the transistors and the difference in sampled signals may be determined by the voltage across a capacitance in an input circuit to the other transistor.

The invention will now be described by way of example, with reference to the accompanying drawings in which.

Figure 1:
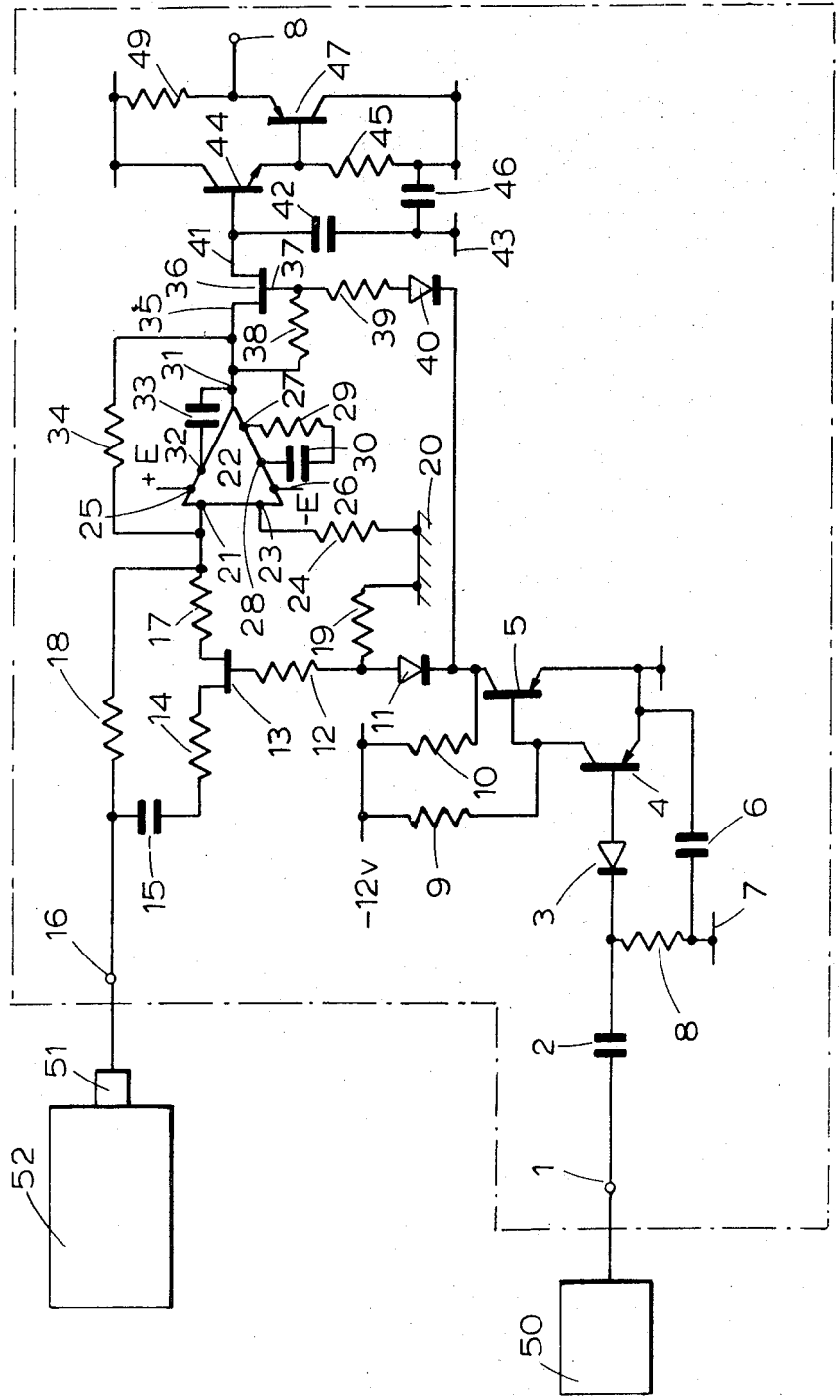
FIG. 1 shows a circuit arrangement in accordance with the invention.

The illustrated circuit arrangement comprises an input terminal 1 connected via a capacitance 2 to the cathode of a diode 3, the anode of which is connected to the base of a PNP transistor 4. The emitter and collector of transistor 4 are respectively connected to the emitter and base of another PNP transistor 5.

A feedback circuit comprises a capacitance 6 connected between the emitter of transistor 4 and an earth potential rail 7 and a resistance 8 connected between the rail 7 and the junction between capacitance 2 and diode 3. The emitter of transistor 4 is connected to a positive supply potential of +12 volts. The base and collector of transistor 5 are connected respectively through resistances 9 and 10 to a negative supply potential of −12 volts. The collector of transistor 5 is also connected to the cathode of a diode 11, the anode of which is connected through a resistance 12 to the gate of an input field-effect transistor, ("FET,") 13. One other terminal, (referred to as the "source," although FET 13 is symmetrical,) of FET 13 is connected through a resistance 14 and capacitance 15 in series to an input terminal 16, whilst the third terminals, (the "drain,") of FET 13 is connected through resistances 17 and 18 in series also to the terminal 16. A resistance 19 connects the junction between diode 11 and resistance 12 to earth at 20.

The junction of resistance 17 and 18 is connected to a non-inverting input 21 of an amplifier 22. An inverting input 23 of amplifier 22 is connected through a resistance 24 to earth at 20. Positive and negative voltage supplies + E, (+ 12 volts,) and − E (− 12 volts,) respectively are connected to amplifier 22 at 25 and 26.

It is convenient to mention at this point that amplifier 22 is made by Fairchild and is their type $\mu$A 709. The terminals of amplifier 22 shown in the drawings will be recognized by those normally skilled in the art. Feedback is provided between terminals 27 and 28 by a resistance 29 and capacitance 30 in series. Output terminal 31 of amplifier 22 supplies feedback to terminal 32 via a capacitance 33. A resistance 34 is connected between output terminal 31 and non-inverting input terminal 21 of amplifier 22.

The output terminal 31 of amplifier 31 is also connected to the source 35 of another FET 36. The gate 37 of FET 36 is connected through a resistance 38 to output terminal 31 of amplifier 22, gate 37 also being connected through a resistance 39 to the anode of a diode 40, the cathode of which is connected to the collector of transistor 5. The drain 41 of FET 36 is connected through a capacitance 42 to a steady potential at 43, conveniently earth, and to the base of an NPN transistor 44. The collector of transistor 44 is connected to the positive voltage supply of + 12 volts, whilst the emitter of transistor 44 is connected through a resistance 45 to the negative voltage supply of − 12 volts. The emitter of transistor 43 is also connected through the resistance 45, a capacitance 46 and the capacitance 42 in that order in series to the base of transistor 44. The emitter of transistor 44 is also connected to the base of a PNP transistor 47, the collector of which is connected to the negative voltage supply of − 12 volts. The emitter of transistor 47 is connected to an output terminal 48 and through a resistance 49 to the positive voltage supply of + 12 volts.

The PNP transistors 4, 5 and 44 are each of type BC 212. The NPN transistor 44 is type BC 183. Each of the FETs 13 and 36 is of type 2 N 3824. Each of the diodes 3, 11 and 40 is type 1 N 914. The resistances have the following values:

Resistance 8 — 22 K

Resistance 9 — 47 K

Resistance 10 — 470 K

Resistance 12 — 22 K

Resistance 14 — 1 K

Resistance 17 — 1 K

Resistance 18 — 100 K

Resistance 19 — 270 K

Resistance 24 — 47 K

Resistance 29 — 1.5 K

Resistance 34 — 100 K

Resistance 38 — 270 K

Resistance 39 — 22 K

Resistance 45 — 220 K

Resistance 49 — 22 K

The capacitances have the following values;

Capacitance 2 — 6,800 pF

Capacitance 6 — 0.1 $\mu$ F

Capacitance 15 — 5 $\mu$ F

Capacitance 30 — 0.01 $\mu$ F

Capacitance 33 — 330 pF

Capacitance 42 — 1.6 $\mu$ F

Capacitance 46 — 1 $\mu$ F.

It will be appreciated that the above-mentioned component types and values are only illustrative, and that different component types and values may be used for different applications according to the natures or types of the speed sensor 50, thermocouple 51 and engine 52.

The transistors 4 and 5 in combination provide drive pulses for input field effect transistor 13, which acts as an input switch, and the further field effect transistor switch 36 acts as an output switch for amplifier 22. The frequency of the pulse signals applied to the input terminal 1 from an engine speed sensor 50, (shown only schematically,) is proportional to the engine speed N. The time constant determined by the capacitance 2 and resistance 8 connected to zero volt supply line 10 controls the on time $T_0$ of the transistor 5. The FET 13 couples input terminal 16 to the amplifier 22 so that when the transistor 13 is on, capacitance 15 charges to the potential applied to the terminal 16. The signal applied to the terminal 16 is derived from a thermocouple 51, (also shown only schematically) mounted on a turbine engine 52 shown schematically. When the transistor 13 is turned on, the transistor 36 is turned on and the output from the amplifier 22 is applied to a hold circuit formed by capacitance 42. The output from the amplifier 22 is therefore applied to a sample and hold circuit, comprising transistor 36 and capacitance 42.

Figure 2:
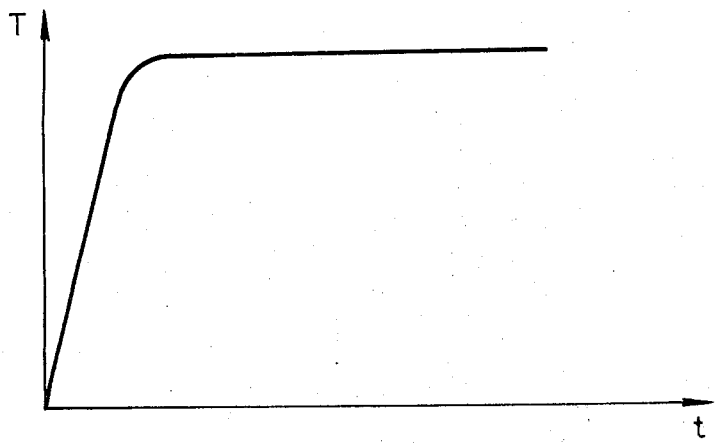
FIG. 2 shows graphically the temperature variation related to time.
Figure 3:
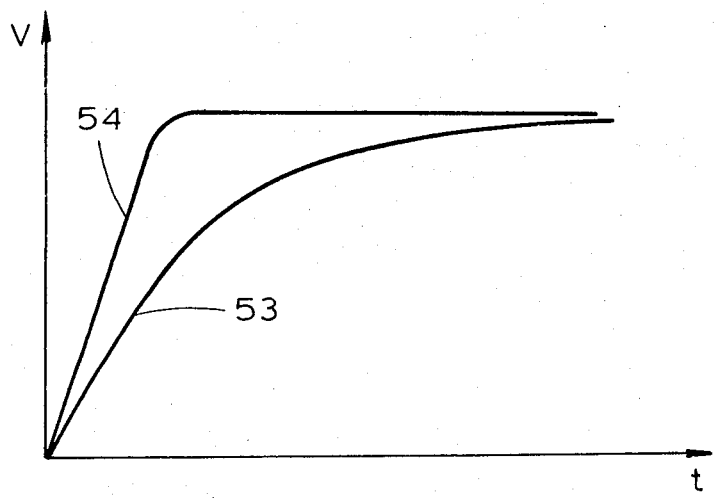
FIG. 3 shows the electrical output signal from a thermocouple subjected to the temperature variations as shown in FIG. 2, and the corrected thermocouple response.

In operation, when the transistor 13 is on, the capacitor 15 charges up to the input level on the terminal 16. Assuming the input signal from the thermocouple 51 does not vary, the capacitor 15 will hold this charge whilst the transistor 13 is off. When the transistor 13 is again turned on, the capacitor 15 will already be charged to the potential applied to the input 16, and so no further charge current is taken. If the input potential on the terminal 16 rises or falls during the off period of the transistor 13, the capacitor 15 will charge or discharge to the new voltage, when the transistor 13 is again turned on, so giving a pulse of current proportional to the difference in input voltage between consecutive samples. This pulse of current is summed at the input of the amplifier 22 with the proportional signal obtained via resistance 18, so increasing the apparent level if it is falling. This can be seen from FIG. 2, which shows a sharp increase in temperature. This sharp rate of increase of temperature results in a thermocouple output signal represented by the line 53 on FIG. 3. The lag in the thermocouple response is due to engine speed dependent time constants. The circuit arrangement shown in FIG. 1 improves the slow response as shown by the line 53 to produce an output signal corresponding to the line 54 on FIG. 3.

Figure 4:
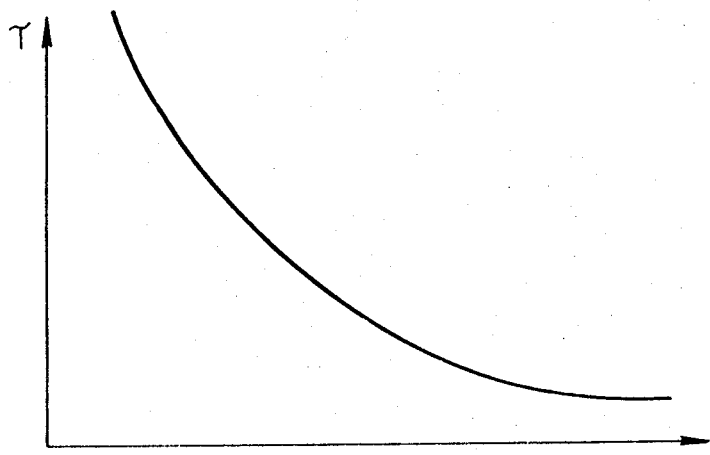
FIG. 4 shows graphically the relationship between engine speed N and the thermocouple time constant $\tau$.

FIG. 4 shows how the thermocouple response time constant varies with engine speed N. It will be seen from this $\tau$ graph that the degree of compensation required must be dependent upon engine speed.

Referring again to FIG. 1, the FET switch 36 is turned on and off at the same time as the FET switch 13, so that the capacitor 42 is charged to the peak level of the output from the amplifier 22. This level is held while the transistor 36 is off, so that the double emitter follower formed by transistors 44 and 47 and resistances 45 and 49 to the output terminal 48 provides minimum drain current from the capacitor 42 while the transistor 36 is off. The pulses applied to the bases of the transistors 13 and 36 from the transistor 5 have a frequency dependent upon engine speed and, due to the time constant provided by the capacitor 2 and resistor 8, the signal consists of constant width mark pulses and variable width space pulses. The width of the mark pulses is sufficient to allow the capacitors 15 and 42 to fully charge during each pulse. In a particular embodiment the engine speed is monitored from a pulse probe 50 associated with the gasifier turbine. This pulse probe 50 provides the pulse frequency signal applied to the terminal 1 and it can be seen that as the frequency of this signal varies, so varying the mark-to-space ratio of the signals applied to the transistors 13 and 36, the sampling frequency of the thermocouple signal applied to the terminal 16 is controlled. It will be appreciated that for any given rate of change of the thermocouple signal applied to the terminal 16, the current required to reset the charge on the capacitor 15 will be dependent upon the sampling frequency. Hence for increasing engine speed, smaller current is required to recharge the capacitor 15 so giving a smaller differential effect and effectively varying the degree of lead provided by the circuit arrangement.

Preferably, the complete circuit arrangement illustrated within the chain-dotted line is produced as a single module including solid state electronic devices.

I claim:

1. A thermocouple response time compensation circuit arrangement for use in a turbine engine system of a type including a speed sensor and a thermocouple, wherein the speed sensor is adapted to produce a periodic electrical signal of a frequency proportional to the engine speed and wherein the thermocouple is arranged to sense the temperature of gas in a predetermined part of the engine and to produce a voltage output of a magnitude dependent on the gas temperature, said thermocouple response time compensation circuit arrangement comprising:

means for sampling the voltage output of the thermocouple to provide first signal proportional to the voltage output;

means for defining time intervals each of a duration inversely proportional to the speed of the engine in response to said speed sensor;

means for detecting the magnitude of the change if any in the magnitude of the output voltage of the thermocouple from the beginning to the end of each respective time interval and for providing at the end of each time interval a limited duration second signal of a magnitude proportional to the magnitude of such change;

means for summing said first signal and said second signal;

means for sampling the sum of said first signal and said second signal periodically and for producing a limited duration third signal of a magnitude proportional thereto; and means for producing a fourth signal of a longer duration than said third signal and a magnitude equal to the magnitude of said third signal;

whereby a given rate of change in the thermocouple output voltage results in said second signal having a greater magnitude the lower the engine speed to compensate for an increase in the thermocouple time constant with a lower engine speed, so that said fourth signal represents a closer approximation to the actual instantaneous gas temperature than said first signal when the gas temperature is changing.

2. A thermocouple response time compensation circuit arrangement as recited in claim 1 wherein:

the voltage output continuous sampling means comprises a first resistance;

the time interval defining means comprises a first electrical switching device;

the magnitude change detecting means comprises a capacitance, a resistance and a second electrical switching device all connected together in series arrangement;

said first resistance is connected across said series arrangement to form a parallel circuit having two terminals;

one terminal of said parallel circuit is an input terminal for connection to the thermocouple;

the other terminal of said parallel circuit is connected to the summing means; and said second electrical switching device is controllably connected to said first electrical switching device.

3. A thermocouple response time compensation circuit arrangement as recited in claim 2 wherein:

said first electrical switching device comprises a pair of transistors connected together;

said second electrical switching device comprises a field effect transistor and a diode, the field effect transistor having a gate electrode; and the gate electrode is connected through the diode to said first electrical switching device.

4. A thermocouple response time compensation circuit arrangement as recited in claim 1 wherein the time interval defining means comprises:

an input terminal for connection to the speed sensor;

a transistor switching circuit; and a time delay circuit;

said time delay circuit comprising a resistance, a capacitance and a diode;

said time delay circuit connecting said transistor switching circuit to said input terminal and being adapted to switch said transistor switching circuit from a first condition to a second condition periodically in response to the speed sensor, to hold said transistor switching circuit in said second condition for a fixed time interval each time that it is switched thereto and then to switch said transistor switching circuit back to said first condition.

5. A thermocouple response time compensation circuit arrangement as recited in claim 1 wherein the periodical sum sampling means comprises:

a field effect transistor having a source, a gate and a drain;

the source being connected to the summing means;

the gate being connected to the time interval defining means; and the drain being connected to the fourth signal producing means.

6. A thermocouple response time compensation circuit arrangement as recited in claim 5 wherein the fourth signal producing means comprises:

a capacitance connected to the drain of the field effect transistor; and a proportional amplifier having an input connected to said capacitance and having an output for said fourth signal.

7. A thermocouple response time compensation circuit arrangement for use in a turbine engine system of a type including a speed sensor and a thermocouple, wherein the speed sensor is adapted to produce a periodic electrical signal of a frequency proportional to the engine speed and wherein the thermocouple is arranged to sense the temperature of gas in a predetermined part of the engine and to produce a voltage output of a magnitude dependent on the gas temperature, said thermocouple response time compensation circuit arrangement comprising:

means for producing a first signal of a magnitude proportional to the magnitude of the thermocouple output voltage;

means for producing a periodic pulse-form second signal at a frequency proportional to engine speed and an amplitude proportional to the change if any of the thermocouple output voltage over each period of said second signal; and means for producing an output signal proportional to the sums of the magnitude of said first signal and said second signal.

* * * * *